(12) United States Patent
Rüppel et al.

(10) Patent No.: US 7,541,767 B2
(45) Date of Patent: Jun. 2, 2009

(54) DECENTRALIZED ERROR RESPONSE IN CAM DISK AXES

(75) Inventors: Wolfgang Rüppel, Frammersbach (DE); Stephan Schultze, Lohr am Main (DE)

(73) Assignee: Bosch Rexroth AG, Stuttgart (DE)

( * ) Notice: Subject to any disclaimer, the term of this patent is extended or adjusted under 35 U.S.C. 154(b) by 661 days.

(21) Appl. No.: 11/371,127

(22) Filed: Mar. 7, 2006

(65) Prior Publication Data

US 2006/0224932 A1    Oct. 5, 2006

(30) Foreign Application Priority Data

Mar. 16, 2005    (DE)    ........................ 10 2005 012 024

(51) Int. Cl.
*G05B 1/06*    (2006.01)

(52) U.S. Cl. ........................ 318/638; 714/100; 451/8; 451/9; 451/5; 700/9; 700/13; 700/21

(58) Field of Classification Search ................. 318/638; 714/100, 2; 700/9, 13, 21

See application file for complete search history.

(56) References Cited

U.S. PATENT DOCUMENTS

| | | | | |
|---|---|---|---|---|
| 5,363,026 | A | * | 11/1994 | Currat ........................ 318/569 |
| 5,386,885 | A | * | 2/1995 | Bunzl et al. ................ 185/40 R |
| 6,277,004 | B1 | * | 8/2001 | Matsumoto et al. ......... 451/127 |
| 6,361,401 | B1 | * | 3/2002 | Matsumoto et al. ............ 451/8 |
| 6,882,948 | B2 | * | 4/2005 | Schroder et al. .............. 702/94 |
| 2002/0133244 | A1 | * | 9/2002 | Schroder et al. .............. 700/61 |
| 2003/0100961 | A1 | * | 5/2003 | Monse et al. .................. 700/61 |

* cited by examiner

*Primary Examiner*—Rita Leykin
(74) *Attorney, Agent, or Firm*—Kenyon & Kenyon LLP

(57) ABSTRACT

The invention relates to a method for error response when an error occurs in response to a motion, particularly of a drive mechanism in a machine, the motion taking place while using at least one master axis and at least one cam disk having at least one input and one output and being controlled by the master axis, in which, in response to the occurrence of the error at the least one input of the at least one cam disk, current process variables that are present are used for the initiation and the execution of the error response. The invention also relates to a corresponding computer system.

16 Claims, 1 Drawing Sheet

DECENTRALIZED ERROR RESPONSE IN CAM DISK AXES

FIELD OF THE INVENTION

The invention relates to a method and to a computer system for error response when an error occurs in response to a motion in a machine and to a corresponding computer program.

DESCRIPTION OF RELATED ART

The invention relates to a method for an error response when an error occurs in response to a motion, especially of a driving mechanism, in a machine, the motion taking place while using at least one master axis and at least one cam disk having at least one input and one output and being controlled by the master axis. In general, a cam disk is activated via a master axis. At each point in the master axis position there exists an equivalent stored in a curve memory of the cam disk. The curve memory includes these equivalents, the so-called position setpoint values of the cam disk, for instance in the form of a table. Thereby, a certain motion profile is specified for the cam disk for the motion of the master axis. In this context, the cam disk is able to be controlled via a really present master axis. A position in the cam disk is linked to each position in the master axis. The cam disk follows the master axis using the motion profile stored in the curve memory.

The coupling resulting from this is equivalent to that of a mechanical coupling of two modules having a shaft. In order to record the master axis position, a recording device is provided which, in turn, is coupled to an input of the cam disk. Furthermore, it is also conceivable that the cam disk is controlled by a virtual master axis. In this context, each position in the master axis position is linked to a position of the cam disk. Here too, the cam disk follows the master axis using the motion profile stored in the curve memory.

It is known that a functionality within the cam disk converts a motion of a so-called master value of the master axis into a so-called position setpoint value profile, using a table stored in the cam disk. In the case of the master value of the master axis, in this context, for example, a master axis position or a master axis speed may be involved. Usually, the motion of a master value is a constant motion, such as a machine speed or a machine master angle. The position setpoint value profile included in the table of the cam disk is generally specified by any law of motion, such as by polynomial pieces.

In the case of an error that occurs in response to a motion, especially in a drive mechanism in a machine, at this time various co-called error responses are carried out with the aid of process variables which, from a control technology point of view, follow the cam disk, that is, the cam disk table. As to the error responses, for instance, a so-called torque disconnect, the resetting of a speed setpoint value to zero or a positioning motion is involved. In the case of the speed setpoint value resetting to zero, perhaps boundary conditions such as an acceleration or a pressure could be specified. In the case of the positioning motion, boundary conditions such as speed, acceleration or pressure could also be specified.

In decentrally constructed systems having decentralized subscribers and having cyclical transmission of a master value via a communications system, when there is a breakdown in a communication, the information of the master value in the decentralized subscribers is missing from the point in time of the occurrence of the error.

In the case of decentrally conducted error responses, which, for instance, occur when a central control transmits a master value information of a master axis via a communications system to decentralized executions, such as drive mechanism, and the communications system breaks down, according to the related art at this time, all axes would be braked constantly to a standstill at a specifiable deceleration. Such a braking motion does not, however, take into consideration the normal, generally inconstant motion that would be yielded by the cam disk functionality. Furthermore, master value-related output signals are no longer ascertained and output, since the master value for these output signals is not changed any more. This means that currently used error responses do not take into consideration the effectively occurring motion profiles in an axis or group of axes. If, for example, a rotary speed setpoint value resetting to zero is used as the error response, then, in this context, only a constant deceleration having an assumed linear motion equation is applied which is not necessarily equivalent or as a rule not equivalent to the effective motion profiles. A result of this may be collisions or machine malfunctions.

Furthermore, damage may also occur because of missing ascertainment of master value-related output signals. Such master value-related output signals may be, for example, cams controlling additional aggregates or so-called sensor emulation signals.

SUMMARY OF THE INVENTION

It is an object of the invention to make available a method with the aid of which it is possible, in response to the occurrence of an error in the case of a motion in a machine, to make available an improved error response, particularly with regard to the above-named disadvantages.

These and other objects of the invention are achieved by a method for error response in response to the occurrence of an error or a malfunction in response to a motion, particularly of a drive mechanism, in a machine having a transmission of a master axis information, the motion taking place while using at least one master axis and at least one cam disk, having at least one input and one output, and being controlled by the master axis, wherein, in the case of a malfunction in the transmission of the master axis information at the at least one input of the at least one cam disk, process variables that are present are used for the initiation and the execution of the error response. The invention also provides a computer system for the error response in response to the occurrence of an error during a motion in a machine, the motion taking place while using at least one master axis and at least one cam disk that has an input and an output and is controlled by the master axis, and that has at least one control unit for detecting the occurrence of the error, at least one read-out unit for reading out the process variables present at the at least one input of the at least one cam disk, and at least one processing unit for initiating and carrying out of the error response using the process variables that were read out.

BRIEF DESCRIPTION OF THE DRAWINGS

The invention will be described in greater detail with reference to the following drawings wherein.

DETAILED DESCRIPTION OF THE INVENTION

Figure 1:
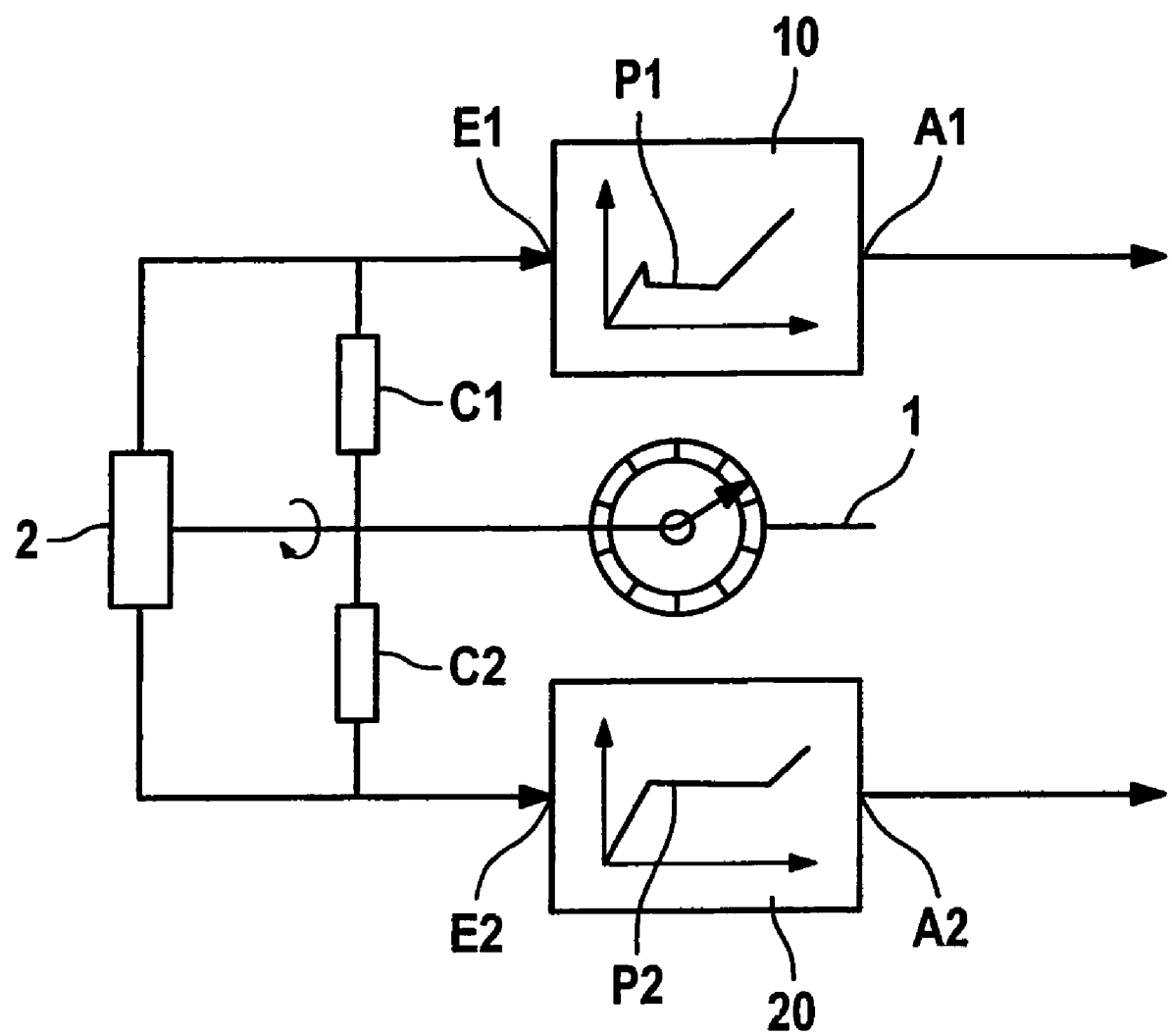
FIG. 1 schematically depicts a possible specific embodiment of a method according to the present invention.

A method is made available for an error response when an error or a malfunction occurs in response to a motion, especially of a driving mechanism, in a machine having a transmission of a master axis information, the motion taking place while using at least one master axis and at least one cam disk having at least one input and one output and being controlled by the master axis. In the case of a malfunction in the transmission of the master axis information, in this context, at the at least one input of the at least one cam disk, process variables that are present are used for the initiation and the execution of the error response.

In one possible specific embodiment of the method according to the present invention, the process variables are determined by a master value specified by the master axis. In this context, for instance, a master value position, a master value speed, a master value acceleration and/or a master value jolt is used.

In an additional possible specific embodiment of the method according to the present invention, a speed setpoint value resetting to zero is carried out as the error response. It is also conceivable that one might execute a so-called positioning motion as the error response. In both cases boundary conditions may be specified in this context, such as acceleration or jolt.

In another specific embodiment of the method according to the present invention, a central master axis is selected as the master axis, which is coupled to the at least one cam disk as the element of a decentrally operating system via a guidance communications system, and the error response is performed decentrally. In the case of such a motion which is centrally transmitted by a controller, that is, controlled by a central master axis, to decentrally working systems via a guidance communications system, the error response, which is possibly initiated based on the failure of the guidance communications system and carried out, is improved thereafter. The master value is still generated in the central controller or the central master axis, and, in the normal case, is transmitted via a guidance communications system, such as a so-called SERCOS interface, to intelligent drive mechanisms. In this context, the cam disk functionalities are included decentrally in the drive mechanisms or are preconnected to the drive mechanisms. If there is a failure of the guidance communications system, then, according to the method according to the present invention, the error response is initiated decentrally.

Based on the initiation and performance of the error response in the light of the master value, it is possible according to the method according to the present invention to carry out decentrally distributed synchronous error responses, which lead, for example, to a machine reacting exactly the same in case of an error as if the master value motion were being specified centrally. By the application of the method of the present invention, signals emitted externally continue to be output and at the correct time. As to the externally emitted signals, master value-related cams, position setpoint value-related cams, master value-related analogous speeds and/or master value-related so-called sensor emulation signals may be involved.

When the method according to the present invention is used, drive mechanism axes, for example, remain in their operating type that was present before the occurrence of the error, such as speed regulation or position regulation. Currently, operating types of drive mechanism axes are generally changed. Thus, for example, a rotary speed setpoint value resetting to zero of a position-regulated axis according to the current related art leads to an operating type change to speed regulation possibly having less favorable process technologies or regulation technology properties.

According to the method according to the present invention, an error response is not carried out with the aid of process variables which follow the cam disk functionality from a regulation technology point of view, but rather with the aid of process variables that precede from a regulation technology point of view. This means that with the aid of process variables of the master value such as a master value position, a master value speed, a master value acceleration and/or a master value pressure an error response is initiated with the aid of a locally formed master axis function. In this connection, according to the present invention almost all error responses are conceivable which are currently possible even for a single axis. Besides the already named speed setpoint value resetting to zero and the positioning motion, other possibilities are conceivable too. In this context it is possible, for instance, to initiate an error response while specifying a deceleration time span or a master value path. Hereby it becomes possible, for example, to run a multi-stage machine empty in a synchronized manner, in that, analogously to a shift register, products in the machine stages by and by are no longer processed. In the case of a positioning motion this is also, for example, able to be achieved via a target position which includes several master value cycles, such as revolutions or machine clock pulses.

If a temporary error, which is to lead to a decentralized delayed shutdown, ceases again within the delay time span, a decentralized error response that has already been initiated and has started to run may be reset again, for instance, by a central controller.

In one additional exemplary specific embodiment of the method according to the present invention, when the error occurs, using the current process variables, a switchover is made to a virtual, especially a local virtual master axis that controls at least one cam disk.

The present invention also relates to a computer system for an error response when an error occurs in response to a motion in a machine, the motion and the use of at least one master axis and at least one cam disk having at least one input and one output and being controlled by the master axis. The computer system according to the present invention, in this context, has at least one control unit for detecting the occurrence of the error, at least one read-out unit for reading out the current process variables present at the at least one input of the at least one cam disk, and at least one processing unit for initiating and carrying out the error response using the read-out process variables.

Furthermore, the computer system according to the present invention may provide a switchover unit in the processing unit which, when the error occurs, using the current process variables, is able to switch over the control of the at least one cam disk automatically to a virtual master axis that is local with respect to the decentralized system Moreover, it is conceivable that in the computer system according to the present invention a memory unit is provided in which one or more error responses are stored.

In addition, the present invention relates to a product for carrying out the method according to the present invention, the product being a computer program having program code which, when the program is run on a computer, is suitable for carrying out the method according to the present invention. The computer program may also be stored on a computer-readable medium.

The present invention also includes a computer-readable data carrier having a computer program stored on it, which includes a program code which, when the computer program is run on a computer, is suitable for carrying out the method according to the present invention.

The present invention also relates to a computer system having a means for storage, in which a computer program having program code is stored which, when the computer program is run on a computer, is suitable for carrying out a method according to the present invention.

It is understood that the aforementioned features and the features yet to be explained below may be used not only in the combination indicated in each instance, but also in other combinations or by themselves, without departing from the scope of the present invention.

A master axis 1 is shown which rotates and generates a so-called master value in the process. The master value may be a master axis positioner a master axis angle or a master axis speed. The master value information is transmitted via a communications system 2 to decentralized processing units, such as drive mechanisms. The decentralized processing units or drive mechanisms are in each case preconnected to cam disks 10 or 20. Cam disks 10 or 20 in each case convert a motion of the master value communicated to them into a corresponding position setpoint value profile, using a table or a motion profile P1 or P2 that is stored in them in each case. Usually the motion of the master value is a constant motion, and the position setpoint value profile P1 or P2, included in the table, is generally specified by any desired law of motion. In case an error occurs, such as, for instance, the breakdown of the communications system 2, an error response is carried out with the aid of process variables which precede the functionality of the cam disks 10 or 20 from a regulation technology point of view. This means that the error response is initiated directly by the master value. In this context, the master value, as was mentioned before, may be a master value position, a master value speed, a master value acceleration or a master value jolt. The master value or the master value information is read out, in this context, before or at the respective inputs E1 or E2 of cam disks 10 or 20, and is used for initiating and carrying out the error response.

Almost all error responses are conceivable as error responses which are currently possible even for a single axis. These are, for example, a speed setpoint value resetting to zero having, possibly, specifiable boundary conditions as well as a positioning motion having, possibly, specifiable boundary conditions. As a further option, a delay time span or a master value path may also be specified before the actual error response is initiated. Hereby it becomes possible, for example, to run a multi-stage machine empty in a synchronized manner, in that, analogously to a shift register, products in the machine stages by and by are no longer processed. In the present example, a master value is now generated by the master axis 1. In the case of an error, such as the failure of guidance communication 2, an error response is now initiated and carried out by systems C1 and C2 with the aid of the generated L. Because of the error response with the aid of the master value, decentrally distributed, synchronous error responses are made possible, which lead to a machine reacting in the case of an error in exactly the same way as if the master value motion were centrally specified. Furthermore, signals emitted externally continue to be output and at the correct point in time. The drive mechanism axes following on respective outputs A1 and A2 remain in their type of operation that was present before the occurrence of the error.

What is claimed is:

1. A method for error response in response to the occurrence of an error or a malfunction in response to a motion in a machine having a transmission of a master axis information, the motion taking place while using at least one master axis and at least one cam disk, having at least one input and one output, and being controlled by the master axis, comprising using process variables that are present for initiation and execution of an error response in response to a malfunction in the transmission of the master axis information at the at least one input of the at least one cam disk.

2. The method according to claim 1, wherein the process variables are determined by a master value specified by the master axis.

3. The method according to claim 2, wherein at least one of master value positions, master value speed, master value acceleration and master value jolt are used as process variables of the master value.

4. The method according to claim 1, wherein a speed setpoint value resetting to zero is carried out as the error response.

5. The method according to claim 1, wherein a positioning motion is carried out as the error response.

6. The method according to claim 1, wherein a central master axis which is coupled to the at least one cam disk as the element of a decentrally operating system via a guidance communications system, is selected as the master axis, and the error response is performed decentrally.

7. The method according to claim 1, wherein at least one of a delay time span and a master value path is specified before or during the initiation of an error response.

8. The method according to claim 1, wherein an already initiated error response is reset in response to discontinuation of the error.

9. The method according to claim 1, wherein, in response to the occurrence of the error, a switchover is made to a virtual master axis which controls the at least one cam disk, using the process variables that are present.

10. A computer system for error response in response to the occurrence of an error during a motion in a machine, the motion taking place while using at least one master axis and at least one cam disk that has an input and an output and is controlled by the master axis, comprising at least one control unit for detecting the occurrence of the error, at least one read-out unit for reading out the process variables present at the at least one input of the at least one cam disk, and at least one processing unit for initiating and carrying out of the error response using the process variables that were read out.

11. The computer system according to claim 10, wherein a switchover unit is provided in the processing unit which is able to switch over the control of the at least one cam disk to a virtual master axis in response to the occurrence of the error, using the process variables that are present.

12. The computer system according to claim 10, wherein a memory unit is provided in which one or a plurality of retrievable error responses are stored.

13. A computer program for carrying out the method according to claim 1, the computer program having program code which, when the computer program is run on a computer, is suitable for carrying out the method.

14. The computer program according to claim 13, which is stored on a computer-readable medium.

15. A computer-readable data carrier having a computer program stored on it that includes a program code which, when the computer program is run on a computer, is suitable for carrying out the method according to claim 1.

16. A computer system having a memory means, wherein a computer program having program code is stored which, when the computer program is run on a computer, is suitable for carrying out the method according to claim 1.

* * * * *